United States Patent Office 3,652,454
Patented Mar. 28, 1972

3,652,454
HIGH PRESSURE WATER-GAS SHIFT
CONVERSION PROCESS
Allen M. Robin, Claremont, and Joseph P. Tassoney, Whittier, Calif., assignors to Texaco Inc., New York, N.Y.
No Drawing. Filed May 27, 1968, Ser. No. 732,074
Int. Cl. C01b 1/08
U.S. Cl. 252—373                                    2 Claims

ABSTRACT OF THE DISCLOSURE

High pressure continuous catalytic water-gas shift conversion process in which CO conversion is maximized and an effluent gas stream comprising essentially $H_2$ and $CO_2$ is produced having a substantially constant composition at all times throughout the life of the catalyst. Process design and operation are optimized to yield an overall CO conversion of about from 80 to 98 mole percent over a period of two years or more on stream. Steam and a CO containing gaseous feedstream are reacted in an adiabatic catalytic reaction zone comprising one or more fixed beds of iron-chromium oxide catalyst connected in series and provided with interbed cooling. The catalyst is characterized by its activity increasing as a function of pressure over the operating range of about 35 to 250 atmospheres. This is contrary to the present general idea that the activity of an iron oxide shift catalyst levels out at about 400 p.s.i.g. The temperature of the gases leaving each bed is maintained in the range of about 30° F. to 100° F. less than the corresponding equilibrium temperature and to offset catalyst deactivation the inlet and exit temperatures of the gas stream in each bed is increased as a logarithmic function of time on stream.

BACKGROUND OF THE INVENTION

Field of the invention

This invention relates to the production of hydrogen and carbon dioxide. More particularly, it relates to producing hydrogen and carbon dioxide from a CO containing gaseous fedstream by an improved continuous catalytic water-gas shift conversion process.

DESCRIPTION OF THE PRIOR ART

In recent years, processes involving chemical synthesis from gases and hydrogenation processes for the manufacture of synthetic ammonia and for the manufacture of motor fuels from coal, tar, and other hydrocarbons have focused attention on methods for producing feedstock streams of hydrogen and gaseous mixtures of hydrogen and carbon oxides.

The well known water-gas shift conversion process for the production of $H_2$ and $CO_2$ provides for the treatment of CO with steam, in the presence of a suitable catalyst at temperatures in the range of from about 750° F. to 1012° F. In general, previous to our invention, catalysts have been employed only at moderate pressures. The water-gas shift reaction is represented stoichiometrically by Equation 1.

$$CO + H_2O \rightleftharpoons CO_2 + H_2 \qquad (1)$$

$CO_2$ and minor amounts of impurities are removed from the effluent stream of gases from the shift converter yielding essentially pure hydrogen. The extent to which reaction (1) proceeds is limited by thermodynamic equilibrium. High CO conversion is favored by a lowered reaction temperature and by excess water vapor. An increased reaction rate may be effected by raising the temperature in the reaction zone.

It is generally believed throughout the industry that the activity of all commonly used commercial iron oxide shift conversion catalysts levels out at a pressure of about 400 p.s.i.g., i.e., increasing the pressure above 40 p.s.i.g. will not increase the activity of the shift catalyst. Thus any increase in pressure above 400 p.s.i.g. would result in an economic penalty. For example, if the feedstream to the inlet to the shift converter consists of the effluent gas from a high pressure synthesis gas generator (600 to 3750 p.s.i.g.), it is common in some conventional processes to reduce the pressure of the synthesis gas before introducing the gas into the shift converter, and then recompressing the shifted gas at the cost of significant energy. However, by operating the shift converter at the same pressure as the gas generator, in accordance with the process of our invention, this disadvantage may be avodied and the size of the shift converter may be reduced.

SUMMARY

This invention pertains to an improved continuous high pressure catalystic water-gas shift conversion process for the maximum conversion of a CO containing gaseous stream into a product stream comprising essentially $H_2$ and $CO_2$ whose composition is maintained substantially constant throughout the life of the catalyst.

The mathematical model used to determine the optimum process design and operating conditions for our high pressure shift converter, comprising one or more fixed beds of iron-chromium oxide catalyst connected in series and provided with interbed cooling, basically assumes that at any pressure over the range of from about 35 atmospheres to 250 atmospheres and at a temperature in the range of about 550° F. to 1000° F., (1) that the rate of reaction is proportional to the displacement of the reactants from equilibrium and that a correction for the effect of pressure on the reaction rate must be made at all pressures, (2) that the classical Arrhenius temperature relationship applies, i.e. $k = Q \exp(-E/RT)$ in which constant Q is the "collision factor" and E is the "activation energy" for the reaction, (3) that for a given conversion the maximum space velocity per bed is achieved when the reactants exit each catalyst bed at a temperature in the range of about 30° F. to 100° F. below the corresponding equilibrium temperature, and (4) a correction for the effect of pressure on $k$ is made at all pressure levels, as will be described later.

The activity of the shift catalyst was found to unexpectedly increase when the pressure in the reaction zone was raised to 35 atmospheres or higher. This pressure effect is contrary to the present general opinion that the activity of an iron-oxide chromium oxide catalyst levels out at about 400 p.s.i.g. The catalyst activity may be calculated now as a function of pressure using the formula $k = k_o P^n$ where $k$ is the second order reaction rate constant for the water-gas shift reaction at pressure P, $k_o$ is the second order reaction rate constant for the water-gas shift reaction at P=1 atm., P is the absolute pressure in the reaction zone in atmospheres, and $n$ is a pressure exponent determined experimentally for each catalyst.

By our improved shift conversion process, the composition of the effluent gas stream from the shift converter may be maintained substantially constant for a period of at least two years on stream with an overall CO conversion greater than 80 mole percent. Steps in the process includes increasing the inlet and exit temperatures of the gas stream in each catalyst bed as a function of time-on-stream to offset catalyst deactivation, maintaining the temperature of the effluent gas from each bed in the range of about 30° F. to 100° F. less than the corresponding equilibrium temperature, and maintaining the pressure in the reaction zone in the range of 35 to 250 atmospheres. In the design of the process corrections for the effect of pressure on the reaction rate are made for all pressures.

It is therefore a principal object of the process of the present invention to produce on a continuous basis a stream of gases comprising essentially hydrogen and carbon dioxide from large volumes of a CO containing gaseous feedstream over a range of pressure from about 35 to 250 atmospheres.

Another object of this invention is to provide a continuous process by which essentially all of the carbon monoxide in synthesis gas is economically and efficiently utilized for the production of hydrogen.

Still another object of this invention is to provide an improved high pressure water-gas shift conversion process which offers maximum CO conversion and in which the composition of the effluent gas stream is substantially constant at all times throughout the life of the catalyst.

One further object of the present invention is to provide an improved water-gas shift conversion process which may be operated at the same pressure as the discharge pressure of the gas generator used to produce the CO containing gaseous feedstream to the shift converter.

DESCRIPTION OF THE INVENTION

This invention comprises the design and novel operating conditions for an improved water-gas shift converter in order to achieve maximum CO conversion and substantially constant composition of the effluent gas stream at all times throughout the life of the catalyst.

In the process of our invention a CO containing gaseous feedstream is introduced with steam into an adiabatic reaction zone of a catalytic water-gas shift converter comprising one or more (usually one to three) separate fixed beds of iron-chromium oxide catalyst in series. The purpose of the shift converter is to generate hydrogen and carbon dioxide according to the water-gas shift reaction shown in equation (1). This reaction is exothermic, liberating approximately 16,400 B.t.u. per mole of CO converted. In order to cool the reaction and achieve high conversion, the gases should be cooled between each catalyst bed. Because high temperatures promote fast reaction rates and low temperatures promote high conversion, it is normally advantageous to operate each succeeding catalyst bed at a lower average temperature. Cooling is achieved between beds with either external indirect heat exchange or with internal direct water injection. Direct condensate injection results in a smaller overall reactor than a reactor using an external heat exchanger due to the higher steam to dry gas ratio (driving force) in the second bed for the same amount of cooling between beds.

The shift catalyst is conventionally manufactured from about 85 to 95 weight percent iron oxides and may contain from about 5 to 15 percent chromic oxide as a promoter. Other promoters include 1 to 15 percent by weight of an oxide of a metal such as thorium, uranium, beryllium or antimony. The catalyst is characterized by heat stability (up to 1184° F.), high activity, good selectivity, resistance to poisoning, constant volume, and long life. It may be obtained in the form of pellets or irregular fragments that range in size from about 5 to 10 mm. and larger, or cylindrical tablets ranging from ¼ in. to ⅜ in. diameter x 3/16" to ⅜" long, of iron and chromium oxides. The composition of the catalyst in each separate bed of a multibed reactor may be varied if desired. The packed density may range from 50 to 100 lbs./cu. ft.

The catalyst used in the process of our invention is characterized by the fact that its activity is a function of pressure over the operating range involved. Further, the catalyst activity may be calculated as a function of pressure using the following general equation:

$$k = k_o P^n \quad (2)$$

where:

$k$ = second order reaction rate constant for the water-gas shift reaction;
$k_o$ = second order reaction rate constant for the water-gas shift reaction at 1 atm. pressure determined experimentally for each catalyst;
$P$ = operating pressure (atmospheres); and
$n$ = pressure exponent determined experimentally for each catalyst.

A quantitative comparison of the activity of commercial iron oxide shift catalyst suitable for the process of our invention may be made on a common basis over 15 to 26 days of operation at a bed temperature of about 750° F. and at several pressures in the range of 35 to 250 atmospheres. A log-log plot of measure space velocity/calculated space velocity for each catalyst as a function of days on stream will produce a series of straight isobars. Since a fixed value for the reaction rate constant is used for each calculation, the ratio of measured to calculated space velocity is a direct measure of the catalyst activity. This activity is seen to increase with increasing pressure and to decrease with increasing time. On the average the activity of each catalyst will increase as the 0.6 power of the absolute pressure. In practice, the pressure exponent $n$ in Equation 2 may be a number in the range of 0.4 to 0.9 when said catalyst is on stream over a minimum period of 15 hours at an average bed temperature of above 750° F.

The relationship expressed by Equation 2 is contrary to the generally accepted belief in industry that the activity of all commonly used iron oxide shift conversion catalysts levels out at a pressure about 400 p.s.i.g. Actually, the increase in catalyst activity with pressure will have a profound effect upon the economics of high pressure shift conversion for as the pressure is increased above 400 p.s.i.g. to a pressure in the range of 35 to 250 atmospheres the amount of catalyst necessary to achieve a given conversion of CO for a given throughput decreases. Further, the size of the reactor needed is reduced and the shift converter may be operated at the same pressure as the synthesis gas generator used to produce the CO containing gaseous feedstream.

The CO containing gaseous feedstream may be produced by such conventional processes as the partial oxidation of a carbonaceous or a liquid hydrocarbon fuel, or by the steam reforming of a hydrocarbon fuel. The mole ratio of $H_2O/CO$ in the feed to a catalyst bed ranges from about 2 to 6/1 and the preferred mole ratio of $H_2O$/dry gas in the feed is about 1.0 to 3.0/1. The inlet temperature to a catalyst bed must be high enough to prevent condensation of water, which is destructive to the catalyst.

The mathematical model used for the design and operation of our shift converter basically assumes (1) that at any pressure and temperature the rate of reaction is proportional to the displacement of the reactants from equilibrium, and that a correction for the effect of pressure on the reaction rate must be made at all pressures, (2) that the classical Arrhenius temperature relationship $k = Q_{EXP}(-E/RT)$ applies; and (3) that for a given conversion, maximum space velocity is achieved when the reactants exit each bed of a shift converter comprising one or more separate beds of catalyst in series at a temperature in the range of about 30° F. to 100° F. (preferably 50° F.) below the corresponding equilibrium temperature i.e., the temperature at which the effluent gas from the catalyst bed is at equilibrium.

Further, a maximum temperature restraint of 950° F. on all beds may be imposed to increase the life of the catalyst. Also, in multibed reactors, where it is desirable to heat the gaseous feedstream to the first bed by means of noncontact indirect heat exchange with the product gas from the last bed, then the temperature differential between said streams should be at least 50° F. for efficient heat exchange.

The rate of reaction of the water-gas shift reaction in the presence of a solid shift catalyst may be adequately represented by the following second order rate equation which relates the rate of reaction to the displacement of the gas composition from its thermodynamic equilibrium value.

$$r_{CO} = k\,[(CO-x)(H_2O-x) - (CO_2+x)(H_2+x)/K_N]$$
$$= \frac{-d(CO)}{V_{cat}\,dt} \quad (3)$$

where:

$r_{CO}$ = rate reaction $\dfrac{\text{(moles CO reacted)}}{\text{(hr) (ft.}^3\text{ catalyst)}}$ $k$ = forward reation rate constant $\dfrac{\text{moles CO reacted}}{\text{(ft.}^3\text{ catalyst) hr.}}$ ( ) = instantaneous concentration of component (wet gas mole fraction);
$K_N$ = equilibrium constant for water-gas shift reaction in terms of mole fractions (dimensionless);
$V_{cat}$ = catalyst volume (ft.$^3$);
$t$ = time (hr.); and
$x$ = moles of CO reacted at any instant per mole of wet gas.

$K_N$ in Equation 3 is replaced by the ratio $K_{EQ}/K_g$. Derivation of this relationship (Equation 10) is described below. $K_{EQ}$ is the equilibrium constant for the water-gas shift reaction and may be defined as follows:

$$K_{EQ} = f_{CO2}f_{H2}/f_{CO}f_{H2O} \quad (4)$$

where: $f$ = fugacity of component relative to one atmosphere. Similarly by definition, the partial pressure equilibrium constant ($K_p$) as a function of pressure may be represented by Equation 5.

$$K_p = p_{CO2}p_{H2}/p_{CO}p_{H2O} \quad (5)$$

where: $p$ = partial pressure of component in atmospheres.

In the pressure and temperature range of interest the gaseous reactants involved in the water-gas shift reaction are not ideal, and the use of $K_p$ in place of $K_{EQ}$ will result in significant errors in calculating equilibrium compositions. Hence, activity coefficients, as defined by Equation 6, are employed:

$$g_i = f_i/p_i \quad (6)$$

where:

$g_i$ = activity coefficient of i-th gaseous species;
$p_i$ = partial pressure of i-th gaseous species; and
$f_i$ = fugacity of i-th gaseous species.

Since the activity coefficient equilibrium constant ($K_g$) may be defined by Equation 7, $$K_g = \frac{g_{CO_2}\,g_{H_2}}{g_{CO}\,g_{H_2O}} \quad (7)$$

by substituting in Equations 4, 5, 6, and 7, $$K_{EQ} = \left[\frac{g_{CO_2}\,g_{H_2}}{g_{CO}\,g_{H_2O}}\right]\left[\frac{p_{CO_2}p_{H_2}}{p_{CO}\,p_{H_2O}}\right] = K_g K_p \quad (8)$$

converting to mole fractions, since $$N_i = P_i/P \quad (9)$$

where: P = total pressure in atmospheres then $$K_{EQ} = K_g K_N \quad (10)$$

From experimental data it may be shown that $K_{EQ}$ for the water-gas shift reaction is related to temperature (T) in degrees Rankine as for example by Equation 11.

$$\log_{10} K_{EQ} = 3578.5/T - 1.8805 \quad (11)$$

By plotting log $K_N$ versus the reciprocal of temperature in degrees Rankine $\times 10^4$, a family of straight isobars are obtained. Further, an equation in which $K_N$ is expressed as a function of temperature and pressure may be derived, as for example Equation 12.

$$K_N = a 10^{b/T} \quad (12)$$

where:

$K_N$ = equilibrium constant based on mole fractions;
$a = 0.01255 + 8.617 \times 10^{-6}P - 2.167 \times 10^{-9}P^2$;
$b = 3606 - 0.34625P + 78.125 \times 10^{-6}P^2$; when
P = pressure in the range of from 0 to 2000 p.s.i.g.; and
T = temperature in the range of from 1124° R. to 1333° Rankine.

The reaction rate constant is commonly related to temperature by means of the Arrhenius Equation 13:

$$k = Q\,\text{EXP}\,(-E/RT) \quad (13)$$

where:

$k$ = reaction rate constant at temperature, T;
Q = collision factor;
E = activation energy for the reaction;
R = Universal gas constant in consistent units; and
T = absolute temperature.

Both Q and E must be determined experimentally for each catalyst of interest. Allowance for catalyst deactivation with time on stream and activity increase with increasing pressure must be made by using a correction factor. This correction factor must be also determined experimentally by a life study of each catalyst.

The temperature in the adiabatic reactor may be related to the degree of CO conversion by means of Equation 14 wherein the heat liberated due to the conversion of CO is equated to the sensible heat gain of the gaseous mixture.

$$T = T_i + \frac{(H_r)(x)}{C_p} \quad (14)$$

where:

T = temperature of gases in adiabatic reactor at point where conversion $x$ has been completed;
$T_i$ = initial temperature of gases in reactor;
$H_r$ = heat of reaction (B.t.u./mole of CO converted) and assumed to be constant throughout the temperature range of interest (16,400 at about 700° F.);
$x$ = conversion (moles of CO converted per mole of wet gas); and
$C_p$ = average specific heat of gases entering bed expressed in B.t.u. per degree F. per mole of wet gas.

Design of our fixed bed continuous flow reactor may be effected by assuming that the reactor will function as an ideal plug flow reactor according to Equation 15.

$$\frac{1}{SV} = \int_0^x \frac{dx}{r_{CO}} \quad (15)$$

where:

SV = wet gas space velocity (s.c.f.h. wet gas per cubic foot of catalyst);
$x$ = conversion (moles CO converted per mole wet gas); and
$r_{CO}$ = the rate of reaction as defined by Equation 3.

Given any set of initial concentrations and temperature, Equation 15 may be integrated numerically using Equations 3, 10, 11, 13, and 14 to yield the required amount of catalyst for any desired conversion and throughput, provided values of $K_{EQ}$, $K_g$, Q, and E are known for each catalyst, and values of component specific heats are known for all substances present in the reacting gas.

The minimum catalyst volume required to achieve a given conversion may be determined by taking the partial derivative of $r_{CO}$ in Equation 3 with respect to temperature and by expressing the result in terms of equilibrium temperature, temperature at which the reaction rate is a maximum, energy of activation, and heat of reaction. It may be shown for most cases using an iron oxide shift catalyst that the maximum space velocity (or minimum catalyst volume) will not vary by more than 3 percent when the gases at the exit of each bed are at a temperature between 30° F. and 100° F. less than their corresponding equilibrium temperature, i.e., if the exit gases were fixed in composition and the temperature raised to the equilibrium temperature, the gases would then be in chemical equilibrium. This appears to be particularly true at high initial steam to dry gas ratios. However, a 50-degree approach to equilibrium is a preferred basis for process design. Given an initial composition and inlet temperature, only a single value of conversion and outlet temperature will satisfy both the 50 degree approach to equilibrium criterion and the energy balance Equation 14. These values are found by iteration for all beds except the last in a multibed reactor. The outlet temperature from the last bed is uniquely defined by the outlet gas composition and the specified approach to equilibrium.

For example, in the design of a two-bed shift reactor with interbed heat exchange and with the inlet gas composition and total conversion specified, first the exit gas composition from the second bed is calculated. Then from the exit gas composition, the associated equilibrium temperature is calculated. The exit gas temperature from the second bed is then set at 50° F. less than the equilibrium temperature. The exit gas temperature and CO conversion across the first bed are calculated by iteration as indicated previously. The CO conversion across the second bed is the difference between the overall CO conversion and the conversion in the first bed. With the conversion across the second bed and the exit gas temperature calculated, the inlet temperature to the second bed may be backed out using the energy balance equation (Equation 14).

The observed reaction rate over the shift catalyst is affected by interdependent factors such as particle size, time on stream, temperature, and pressure. For example, an evaluation of a commercial iron oxide shift catalyst may show that the unreacted CO expressed as percent of dry shifted gas (CO leakage) is about 2.2 after one day on stream and about 3.2 after two years on stream. While freshly prepared catalyst may have a surface area of 100 sq. m./g., after 50–100 hours of operation at 750° F., the surface area may have decreased to approximately 30–50 sq. m./g. Further, after 12 months on stream the surface of this catalyst may have decreased to about 15 sq. m./g. The catalyst apparently sinters upon aging, thereby resulting in a loss of surface area and related activity. It may be shown that the increase in the reaction rate with pressure is related to the increased availability of the internal surface area of the catalyst.

The effect that catalyst deactivation (due to time-on-stream) has on depressing the reaction rate may be offset by increasing the pressure or the temperature in the reaction zone. A practical procedure is to increase the inlet and outlet temperatures in each bed as a logarithmic function of time on stream for the life of the catalyst. For example, a three bed shift converter using commercial iron oxide-chromium oxide shift catalyst may be operated to obtain maximum CO conversion over a period of about 1000 days on stream by increasing as a logarithmic function of the days-on-stream the temperature of the CO containing gaseous feedstream at the inlet to the first bed in the range of about 550° F. to 750° F. and the exit temperature from the first bed in the range of about 900° F. to 1000° F. while maintaining the dry gas space velocity in the range of from about 2000 to 5000; increasing as a logarithmic function of the days-on-stream the temperature of the gaseous feed stream at the inlet to the second bed in the range of about 600° F. to 800° F. and the exit temperature from the second bed in the range of about 650° F. to 900° F. while maintaining the dry gas space velocity in the range of from about 1000 to 2500; and increasing as a logarithmic function of the days-on-stream the temperature of the gaseous feedstream at the inlet to the third bed in the range of about 600° F. to 750° F. and the exit temperature from the third bed in the range of about 600° F. to 800° F. while maintaining the dry gas space velocity in the range of from about 500 to 1250.

DESCRIPTION OF THE PREFERRED EMBODIMENTS

The following examples are offered as a better understanding of the present invention but the invention is not to be construed as limited thereto.

EXAMPLE I

Some of the advantages of the process of our invention will be further illustrated by Example I, as summarized by the information shown in Table I.

About 3034 lb. moles/hour of a CO containing gaseous feedstream comprising synthesis gas and having the composition (dry basis) shown in Table I, and about 3,488 lb. moles/hour of steam are introduced into the reaction zone of a water-gas shift converter at a pressure of about 533 p.s.i.g. The reaction zone comprises three fixed beds of catalyst (iron-chromium oxides) in series. The temperature of the gaseous feedstream introduced into the first catalyst bed is maintained at about 606° F. to effect a CO conversion of 76.7 mole percent and to increase the hydrogen content from 45.77 to 60.50 mole percent (dry basis). As the water-gas shift reaction is exothermic, the effluent gas from each bed is cooled before being introduced into the next bed. Temperature control is effected by spraying a total of 944 moles/hour of additional $H_2O$ into the feed gas stream between the beds.

As the concentration of CO in the feedstream to the first bed is greater than in the other two beds, the first catalyst bed is made smaller than the other beds to control the amount of heat liberated. Thus, the maximum temperature constraint (about 950° F.) set to prevent deterioration of the catalyst, and the space velocities as well as the inlet and exit gas temperatures for the three catalyst beds are shown in Table I. These variables may be determined in accordance with previously described principles.

The effluent gas stream from the first catalyst bed is cooled from a temperature of about 933° F. to a temperature of about 660° F. and introduced into the second catalyst bed. There, an additional 14.8 mole percent of the CO from the original feedstream is converted into $H_2$ and $CO_2$. Stated another way, on the first day of operation 63.6 mole percent of the CO in the gas stream entering catalyst bed 2 is converted. Since the gas stream introduced into the third catalyst bed comprises only about 2.86 mole percent (dry basis) of CO as compared to 8.26 mole percent in the feedstream to catalyst bed 2, it is necessary to operate catalyst bed 3 at a lower temperature than bed 2 to obtain maximum conversion, and to make bed 3 larger than bed 2 to increase the holding time. The feed gas to the first bed is heated to reaction temperature by indirect heat exchange with the product gases leaving the third bed of the shift converter.

The effluent gas stream from the second catalyst bed is cooled from a temperature of about 713° F. to a temperature of about 648° F. and then introduced into the third catalyst bed. There, an additional 3.35 mole percent of the CO from the original feedstream is reacted with $H_2O$, making the overall conversion of CO across the three bed shift converter equal to about 94.85 mole percent on the first day of operation.

As the catalyst ages on stream, it deactivates and the CO leakage (percent of CO in dry initial feedstream to shift converter that remains unconverted) increases. To minimize this disadvantage, the average temperature of the reactants in each catalyst bed is gradually increased over the two year period that the system is on stream.

Results of the actual calculations, based on previously described equations, to determine the optimum inlet and exit operating temperatures as a logarithmic function of time on stream for each of the three beds at rated throughput are shown in Table I above. The dynamic nature of the shift converter can be seen from this data, and it becomes apparent that the bed temperatures will require periodic readjustment throughout the life of the catalyst if maximum performance is to be attained.

By comparing the composition of the product gas from the third catalyst bed after the 1st and 730th day, it is evident that the process of our invention will maintain the composition of the effluent gas from the shift converter substantially constant during the life of the catalyst. Also, it is shown that during this period the overall CO conversion decreased only from 94.85 to 90.9 mole percent.

EXAMPLE II

It may be shown by Example II that contrary to the general opinion in industry today, the activity of the iron oxide-chromium oxide shift conversion catalyst used in the process of our invention continues to increase with increasing pressure above 35 atmospheres. About 11.81 moles/hour of steam are reacted in the first catalyst bed of a multibed adiabatic water gas shift converter as described in Example I with about 7.47 lb. moles/hour of synthesis gas comprising about 48 mole percent of CO (dry basis). The gaseous feedstream has an inlet temperature of 650° F. and a space velocity of 2739 s.c.f.h./c.f. (basis dry gas). The first catalyst bed contains about 78 lbs. of a catalyst comprising about 85 wt. percent of $Fe_2O_3$ and 15 wt. percent of $Cr_2O_3$ and is maintained at a pressure of 562 p.s.i.g. and an average temperature of about 768° F. After about 15 days on stream, the CO conversion in the first bed is 77.3 mole percent and the second order reaction rate constant as determined by equations 3–15 is about 25,000.

By increasing the pressure in the reaction zone from 562 p.s.i.g. to 1216 p.s.i.g. while maintaining fairly constant the average operating temperature and space velocity (759° F. and 2698 s.c.f.h./c.f. respectively), the catalyst activity is increased about 50%. Under such conditions, the CO conversion in the first bed is 84.0 mole percent and the second order reaction prior rate constant as determined by Equations 3–15 is 40,000. Thus, the amount of catalyst necessary to achieve a given conversion of CO for a given throughput is decreased by increasing the pressure. This permits a decrease in the size of the shift converter and a substantial economic benefit.

The process of the invention has been described generally and by examples with reference to gaseous feedstocks, effluent gas streams, catalysts, and various other materials of particular composition for purposes of clarity and illustration only. From the foregoing it will be apparent to those skilled in the art that the various modifications of the process and the materials disclosed herein can be made without departure from the spirit of the invention.

We claim:

1. In a catalytic water-gas shift conversion process wherein a stream of synthesis gas comprising $H_2$ and CO is reacted with steam at superatmospheric pressure in one or more beds of water-gas shift catalyst comprising iron oxide in series and provided with interbed cooling, the improvement comprising (1) introducing the reactants comprising about 1.0 to 3.0 moles of steam per mole of CO containing synthesis gas (dry basis) into each bed of said water-gas shift catalyst whose activity is directly related to the pressure therein at an inlet temperature in the range of about 550° F. to about 1000° F. and at a pressure in the range of about 35 to 250 atmospheres;

(2) reacting in each catalyst bed said $H_2O$ and CO to produce $H_2$ and $CO_2$, and withdrawing from each bed an effluent gas stream having an exit temperature in the range of about 600 to 1000° F.;

(3) cooling said effluent stream from each catalyst bed prior to introducing said stream as feed into the next bed of catalyst; and (4) gradually increasing the pressure in each bed of water-gas shift conversion catalyst as a function of time-on-stream to offset catalyst deactivation and to produce an effluent gas stream whose composition is substantially constant over the life of the catalyst.

2. The process of claim 1 wherein the water-gas shift catalyst in each bed comprises about 85 to 95 wt. percent of $Fe_2O_3$ and about 5 to 15 wt. percent of $Cr_2O_3$.

References Cited

UNITED STATES PATENTS

| | | | |
|---|---|---|---|
| 2,135,694 | 11/1938 | Bardwell et al. | 252—376 |
| 2,829,113 | 4/1958 | Barry et al. | 252—376 |
| 2,865,864 | 12/1958 | Gastman et al. | 252—376 X |
| 2,870,096 | 1/1959 | Baumann | 252—373 |
| 3,081,268 | 3/1963 | Marshall | 252—376 UX |
| 3,345,136 | 10/1967 | Finneran et al. | 252—373 |
| 3,367,882 | 2/1968 | Marshall | 252—376 |
| 3,418,082 | 12/1968 | Haar | 252—373 X |
| 3,441,393 | 4/1969 | Finneran et al. | 252—376 X |
| 1,756,934 | 5/1930 | Beekley | 23—213 |
| 2,747,967 | 5/1956 | Markert et al. | 23—213 X |
| 3,010,807 | 11/1961 | Christensen et al. | 23—213 X |
| 3,382,045 | 5/1968 | Habermehl et al. | 23—213 |

FOREIGN PATENTS

| | | | |
|---|---|---|---|
| 1,416,141 | 9/1965 | France | 252—373 |

OTHER REFERENCES

MOE, Chemical Engineering, Progress, vol. 58. No. 3 pp. 33–36, 1962.

Atwood et al., Ind. Eng. Chem., 42, 1600–1602, 1950.

Hougen et al., Chemical Process Principles, John Wiley and Sons, New York, Part 3, Kinetics and Catalysts, 1947, pp. 930–932.

HOWARD T. MARS, Primary Examiner

U.S. Cl. X.R.

23—213